US008780105B2

(12) United States Patent
Barbina et al.

(10) Patent No.: US 8,780,105 B2
(45) Date of Patent: Jul. 15, 2014

(54) DISPLAY OF A THREE-DIMENSIONAL VIRTUAL SPACE GENERATED BY AN ELECTRONIC SIMULATION SYSTEM

(75) Inventors: Marco Barbina, Campoformido (IT); Pierpaolo Rosin, Fiumicello (IT)

(73) Assignee: Selex Galileo S.p.A., Via Albert Einstein (IT)

( * ) Notice: Subject to any disclaimer, the term of this patent is extended or adjusted under 35 U.S.C. 154(b) by 792 days.

(21) Appl. No.: 12/696,625

(22) Filed: Jan. 29, 2010

(65) Prior Publication Data

US 2010/0194746 A1 Aug. 5, 2010

(30) Foreign Application Priority Data

Jan. 30, 2009 (IT) .............................. TO2009A0058

(51) Int. Cl.
*G06T 15/00* (2011.01)
*G06F 13/14* (2006.01)

(52) U.S. Cl.
USPC ......................................... 345/419; 345/672

(58) Field of Classification Search
CPC ................................................. A63F 2300/66
See application file for complete search history.

(56) References Cited

U.S. PATENT DOCUMENTS

| 6,144,381 | A | * | 11/2000 | Lection et al. ................ 715/850 |
| 7,299,420 | B2 | * | 11/2007 | Cable ............................. 715/764 |
| 2001/0035906 | A1 | * | 11/2001 | Fukuda ......................... 348/169 |
| 2004/0001110 | A1 | | 1/2004 | Khan |
| 2004/0085335 | A1 | | 5/2004 | Burlnyk et al. |
| 2004/0104896 | A1 | * | 6/2004 | Suraqui ......................... 345/168 |
| 2007/0159497 | A1 | * | 7/2007 | Gur et al. ...................... 345/650 |
| 2007/0270215 | A1 | * | 11/2007 | Miyamoto et al. ............. 463/32 |
| 2008/0094358 | A1 | | 4/2008 | Sullivan |
| 2008/0252786 | A1 | * | 10/2008 | Tilford et al. ................ 348/571 |

OTHER PUBLICATIONS

Search Report for IT T020090058 completed Oct. 30, 2009.

\* cited by examiner

*Primary Examiner* — Kee M Tung
*Assistant Examiner* — Zhengxi Liu
(74) *Attorney, Agent, or Firm* — Alston & Bird LLP (57) ABSTRACT

An electronic system for displaying a three-dimensional simulation scenario comprising a calculation unit configured so as to generate a three-dimensional simulation scenario, a display device for displaying the three-dimensional simulation scenario, a virtual video camera set in a displacement plane positioned in turn within the three-dimensional simulation scenario, a pointer set in the displacement plane, a control system configured in such a way as to displace the pointer in the displacement plane in response to a manual action of the user, a processing device configured in such a way as to control a roto-translation of the virtual video camera in the displacement plane in response to a translation of the pointer in the displacement plane itself.

23 Claims, 8 Drawing Sheets

DISPLAY OF A THREE-DIMENSIONAL VIRTUAL SPACE GENERATED BY AN ELECTRONIC SIMULATION SYSTEM

The present invention relates to the display of a three-dimensional virtual space generated by an electronic simulation system.

In particular, the present invention finds advantageous, though non-exclusive, application in the field of virtual graphic representation of a three-dimensional space, which represents a real environment generated by an electronic simulation system, which is configured in such a way as to simulate control of displacement of vehicles, such as, for example, land vehicles, and/or sea vehicles, and/or aircraft, within the three-dimensional virtual space itself, to which the ensuing treatment will make explicit reference, without this implying any loss in generality.

BACKGROUND OF THE INVENTION

As is known, in the sector of 3D graphic simulation for controlling displacement of vehicles within a real environment represented by a three-dimensional virtual graphic space, there exists the need of being able to observe and monitor the events and situations that occur within the three-dimensional virtual space in the course of simulation.

For this purpose, electronic display apparatuses have been developed, which interact with a virtual electronic simulation system in such a way as to enable an operator to view, through a virtual video camera, the scenario in which the virtual simulation occurs and at the same time control displacement of the virtual video camera itself within the three-dimensional virtual space so as to be able to observe, for example, the objects involved in the simulation from any point present within three-dimensional space and/or according to any angle of view.

Some of the display apparatuses of the type described above, typically referred to by the term "stealth-view devices" or "tactical-situation displays", find application, for example, in flight-simulation systems for aircraft used for training pilots.

In particular, the aforesaid display apparatuses typically comprise a display and a computer that is configured for interacting with the electronic simulation system so as to represent through the display the three-dimensional scenario that represents the simulated flight of the aircraft controlled by the pilot.

Display apparatuses further comprise a manual-control system, which is, in turn, provided with a mouse and a keyboard for issuing commands, through which an operator is able to "navigate" within the three-dimensional scenario and at the same time move the virtual video camera, in such a way as to be able to display the aircraft and/or the environment that surrounds the aircraft itself according to any spatial angle.

It is moreover known that, in the course of the aforesaid simulation, the operator, who is typically a flight instructor, must necessarily control, through the aforesaid manual-control system, navigation in the virtual three-dimensional environment in such a way as to be able to observe and control, instant by instant, the correctness of the command operations imparted to the aircraft by the pilot.

In the systems described above, there exists the need on the part of the instructor to be able to control manually with a certain rapidity his own navigation in the three-dimensional space so as to track the aircraft easily along the corresponding path, keeping the virtual video camera constantly pointed on certain parts of the aircraft, such as for example the front or the rear, irrespective of the displacement of the aircraft itself.

In other words, it is necessary for the instructor to be able to impart in an extremely simple, fast and intuitive way commands for translating the virtual video camera in such a way as to track the aircraft and at the same time impart commands for rotating the virtual video camera in space in such a way as to keep pointing of the latter on some pre-set parts of the aircraft itself.

For this purpose, numerous efforts have been made on the part of firms producing flight-simulation systems for developing display systems provided with systems for issuing commands structured for simplifying and rendering extremely fast and intuitive for the operator execution of manual commands for control of translation and rotation of the virtual video camera in the three-dimensional simulation space, but there still remains much to be done.

US2004/001110 describes a navigation system oriented to displaying an object in a three-dimensional space. The system envisages translation of the virtual camera on the basis of a movement of translation of the mouse and of orienting the camera through a calculation of the normal surface that is closest to the camera.

US2008/094358 describes a navigation system oriented to an object provided with two distinct systems for issuing commands of movement of the virtual video camera, one of which carries out a check on the two-dimensional movement and envisages the use of a mouse, whilst the other system is designed to implement a control of the three-dimensional movement and envisages the use of motion controllers and a handle.

US2004/085335 describes a navigation system in which the movement of the virtual video camera is constrained to a pre-set path by the creator of the contents to be displayed.

SUMMARY OF THE INVENTION

The aim of the present invention is consequently to provide a system that will enable an operator to control in a simple, fast, and intuitive way displacement of the virtual video camera in the three-dimensional space that represents a simulation environment.

According to the present invention, an electronic system for displaying a three-dimensional simulation scenario is provided, as claimed in the attached Claims.

According to the present invention, a computer implemented method for displaying a three-dimensional simulation scenario is moreover provided, as claimed in the attached Claims.

According to the present invention, an electronic device for displaying a three-dimensional simulation scenario is moreover provided as claimed in the attached Claims.

Finally, according to the present invention a computer product that can be loaded in the memory of a computer is provided as claimed in the attached Claims.

BRIEF DESCRIPTION OF THE DRAWINGS

The present invention will now be described with reference to the annexed drawings, which illustrate a non-limiting example of embodiment thereof, and in which.

DETAILED DESCRIPTION OF THE INVENTION

Figure 1:
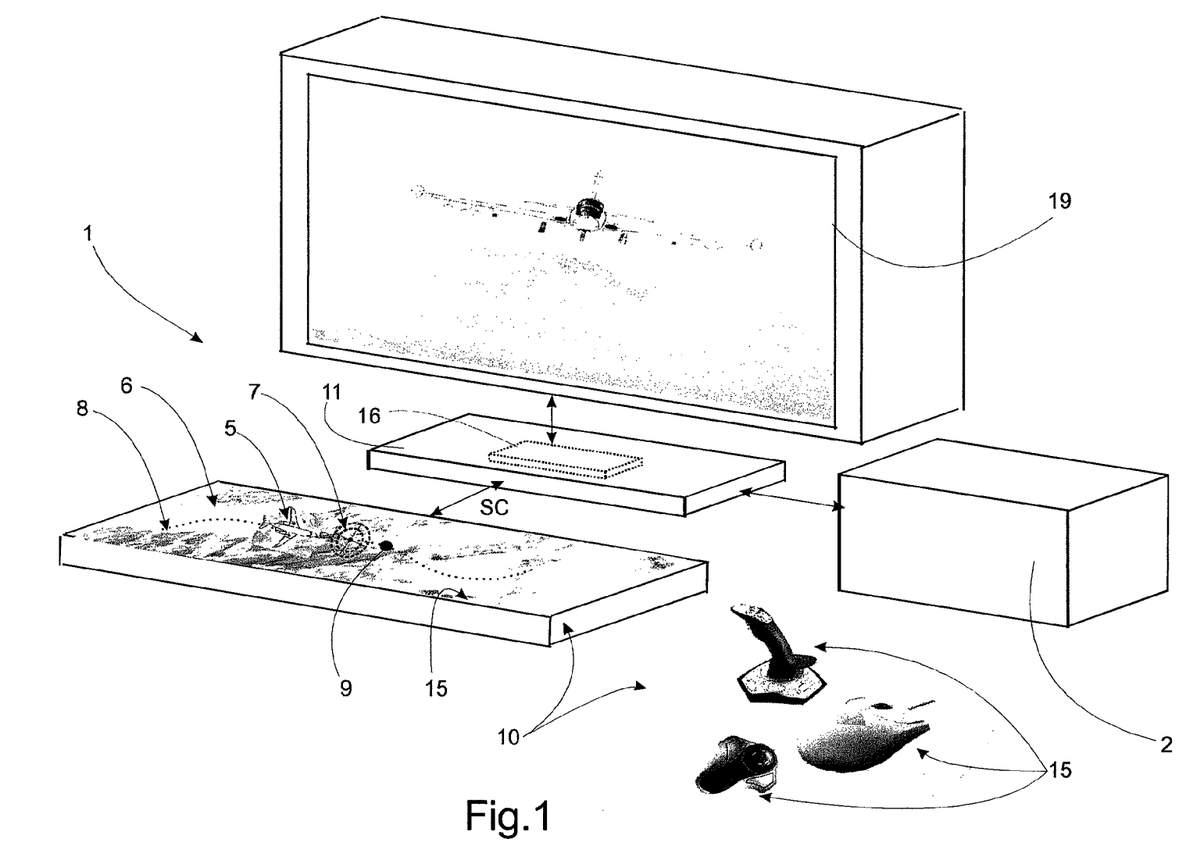
FIG. 1 is a schematic illustration of an electronic system for displaying a three-dimensional simulation scenario, provided according to the teachings of the present invention.

With reference to FIG. 1, number 1 designates as a whole an electronic display system configured in such a way as to enable a user to "navigate" within a three-dimensional virtual space, which graphically represents an environment or a simulation scenario so as to be able to observe events and/or situations that occur within the three-dimensional virtual space itself in the course of the simulation.

In the example shown in FIG. 1, the electronic display system 1 comprises an electronic simulation system 2 configured for implementing an algorithm that generates a "three-dimensional simulation scenario" designated hereinafter by the reference number 3.

Figure 2:
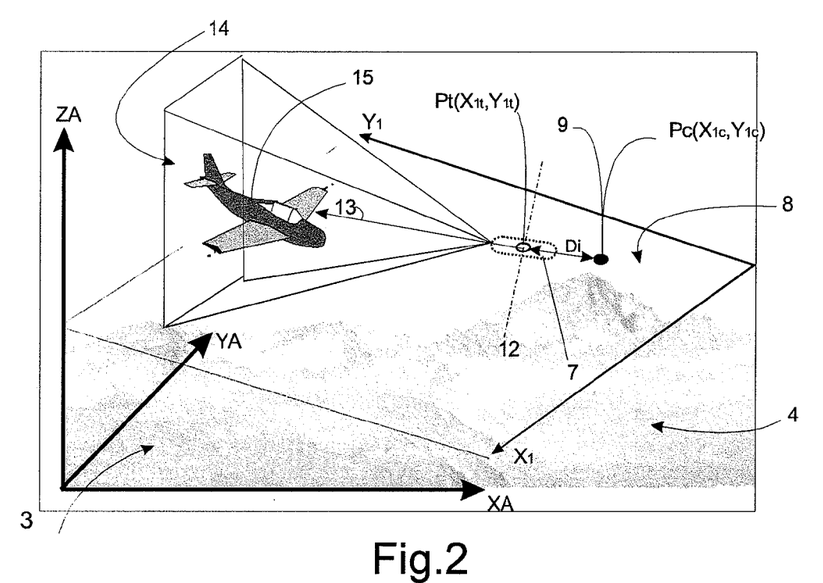
FIGS. 2 and 3 are schematic illustrations of an example of three-dimensional simulation scenario generated by the system shown in FIG. 1.

For instance, represented in FIG. 2 is a three-dimensional simulation scenario 3, which is generated by the algorithm and comprises: a main reference system defined by three orthogonal axes XA, YA, ZA; a pre-set three-dimensional virtual graphic space 4 arranged according to the main reference system and associated to a real Earth environment; preferably, but not necessarily, one or more vehicles 5 (just one of which is shown in the attached figures), which are represented in a three-dimensional graphic format and are mobile within the three-dimensional virtual graphic space 4 on the basis of a simulation program and/or of pre-set displacement commands, and/or on the basis of displacement commands imparted by a user to the electronic simulation system 2 through a purposely provided command interface (not illustrated). The mobile vehicles 5 used in the simulation can correspond to land vehicles of any type, and/or sea vehicles, and/or aircraft, to which the ensuing treatment will make explicit reference, without this implying any loss of generality.

The simulation algorithm does not represent the subject of the present invention and will consequently not be described any further herein.

Figure 3:
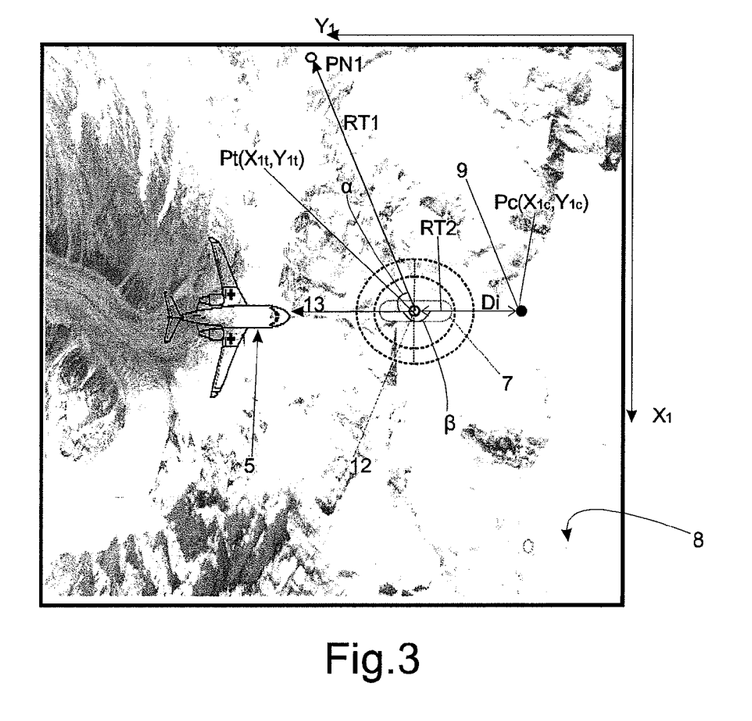

With reference to FIGS. 1, 2 and 3, the electronic display system 1 basically comprises a graphic interface provided with at least one display 6 designed to display the three-dimensional simulation scenario 3 generated by the electronic simulation system 2, a virtual video camera 7 set in an imaginary plane of displacement 8 located within the virtual three-dimensional scenario 3 (shown in FIG. 2), and a pointer 9 set in the displacement plane 8 itself.

The electronic display system 1 further comprises a control system 10 configured for displacing the pointer 9 in the imaginary plane of displacement 8 in response to a manual action of the user, and a processing unit 11 configured for controlling a roto-translation of the virtual video camera 7 in the imaginary plane of displacement 8, in response to a translation of the pointer 9 in the imaginary plane of displacement 8 itself.

In detail, with reference to FIGS. 2 and 3, the imaginary plane of displacement 8 is represented via a cartesian plane, which is defined by two orthogonal axes $X_1$ and $Y_1$ and can be oriented upon command within the three-dimensional virtual graphic space 4, whilst the virtual video camera 7 is represented by a point $Pt(X_{1t}, Y_{1t})$ that indicates the position thereof in the imaginary plane of displacement 8.

In particular, the virtual video camera 8 comprises a virtual objective having a pointing axis 13 centred on the point $Pt(X_{1t}, Y_{1t})$ and is configured for rotating with its own pointing axis 13 about an axis of rotation 12, which is set orthogonal to the imaginary plane of displacement 8 and intersects the point $Pt(X_{1t}, Y_{1t})$.

Figure 4:
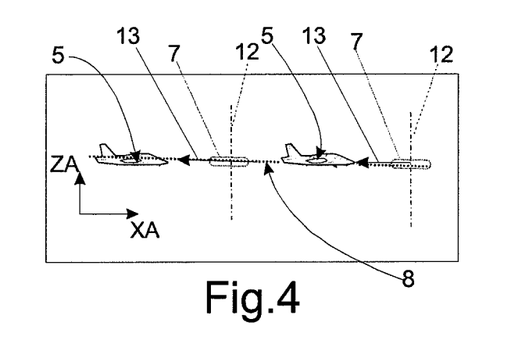
FIGS. 4 and 5 show as many examples of the position of the pointing axis of the virtual video camera used by the system with respect to a displacement plane.
Figure 5:
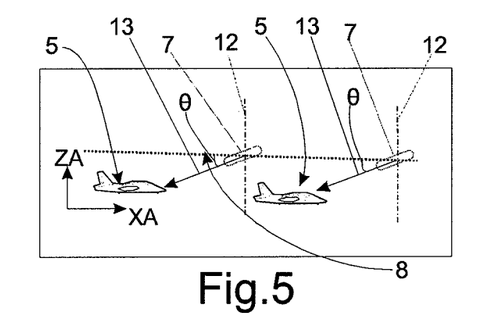

In the specific case, the pointing axis 13 of the virtual video camera 7 can lie in the imaginary plane of displacement 8 and then rotate together with the virtual video camera 8 about the axis of rotation 12, keeping itself in the imaginary plane of displacement 8 according to what is shown in the example of FIG. 4, or else can be inclined by a pre-set angle θ with respect to the imaginary plane of displacement 8 and rotate, together with the virtual video camera 8, about the axis of rotation 12 maintaining its own inclination θ in the course of rotation.

With reference to FIGS. 2 and 3, the virtual video camera 7 is configured in such a way as to acquire images corresponding to the three-dimensional simulation scenario 3 through a virtual observation window 14, which is set orthogonal to the pointing axis 13 in such a way as to be constrained to the latter so as to be subjected to the same movement of roto-translation as the virtual video camera 7.

With reference to FIGS. 1, 2, and 3, the pointer 9 is instead positioned in the imaginary plane of displacement 8 in a point $Pc(X_{1c}, Y_{1c})$, which is set in turn at a distance Di from the point $Pt(X_{1t}, Y_{1t})$ i.e., from the virtual video camera 7.

The processing unit 11 is configured in such a way as to translate the axis of rotation 12, keeping it parallel to itself in the imaginary plane of displacement 8 and at the same time rotates the pointing axis 13 about the axis of rotation 12 in response to a translation of the pointer 9 in the imaginary plane of displacement 8 itself.

For simplicity of description, in FIG. 3 the pointing axis 13 lies in the imaginary plane of displacement 8 and forms an azimuthal angle α with a straight line RT1 passing through the point $Pt(X_{1t}, Y_{1t})$ and a fixed reference point PN1 belonging to the reference system of the three-dimensional virtual graphic space 4 and associated preferably, but not necessarily, to the geographical North of the Earth reference system, whereas the pointing axis 13 forms an angle β with a straight line RT2 passing through the points $Pt(X_{1t}, Y_{1t})$ and $Pc(X_{1c}, Y_{1c})$.

As will be described in detail hereinafter, the processing unit 11 is configured for implementing an algorithm for roto-translation of the pointing axis 13, which envisages determination, instant by instant, of the displacement to be imparted on the point $Pt(X_{1t}, Y_{1t})$ and the variation of the angle α as a function of the translation of the point $Pc(X_{1c}, Y_{1c})$ associated to the pointer 9 in the displacement plane 8.

With reference to FIG. 1, the control system 10 can comprise: a manual pointing device 15, designed to generate a control signal SC in response to a manual movement on the part of the user; and an electronic control module 16, which receives the control signal SC and is able to displace the pointer 9 in the imaginary plane of displacement 8 as a function of the control signal SC, i.e., in response to the manual movement by the user.

In particular, the manual pointing device 15 can correspond to any device that can enable a user to control the position of the pointer 9 manually in the imaginary plane of displacement 8 and can comprise, for example, a mouse, or a joystick, with two-dimensional detection of motion, or a gamepad, a trackball, or any other device for pointing on a screen of this sort.

In the example shown in FIG. 1, the display 6 is a touch screen, which, in addition to performing the functions of display described above, is configured for performing the function of a manual pointing device 15; i.e., it generates the control signal SC as a function of the detection of touch by an operator on its own external display surface. In the case in point, the touch of the operator on the display 6 is represented in FIG. 1 by the point $Pc(X_{1c},Y_{1c})$, which coincides precisely with the pointer 9.

In the example shown in FIG. 1, the system 1 further comprises a screen 19, which is able to display the images acquired by the virtual video camera 7 through the virtual observation window 14.

Figure 6:
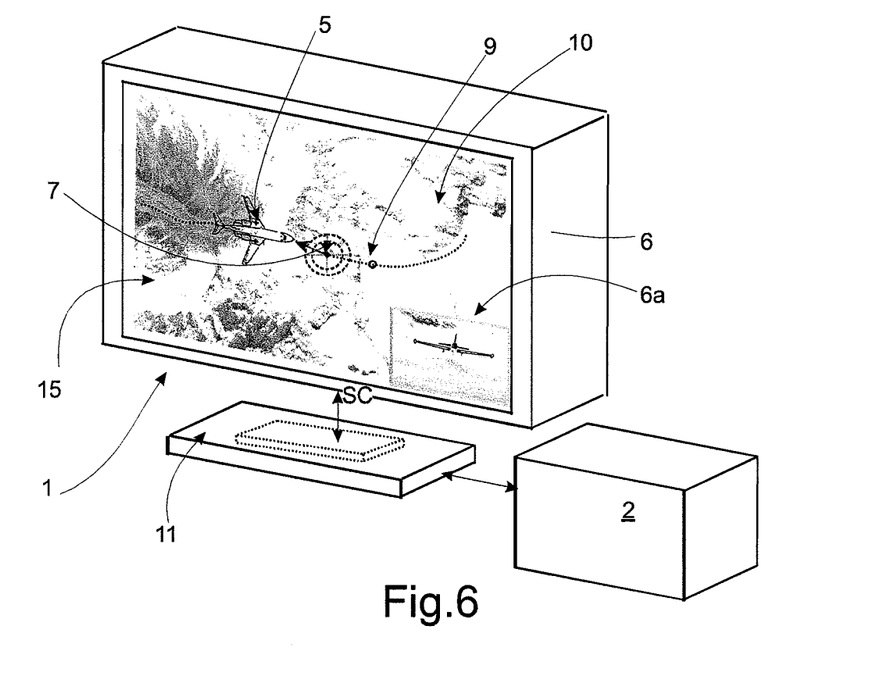
FIG. 6 is a schematic illustration of a possible embodiment of the system shown in FIG. 1.

According to a possible embodiment shown in FIG. 6, the system 1 is without the screen 19 and the images acquired by the virtual video camera 7 through the virtual observation window 14 are shown in a display portion 6a of the display 6.

Figure 7:
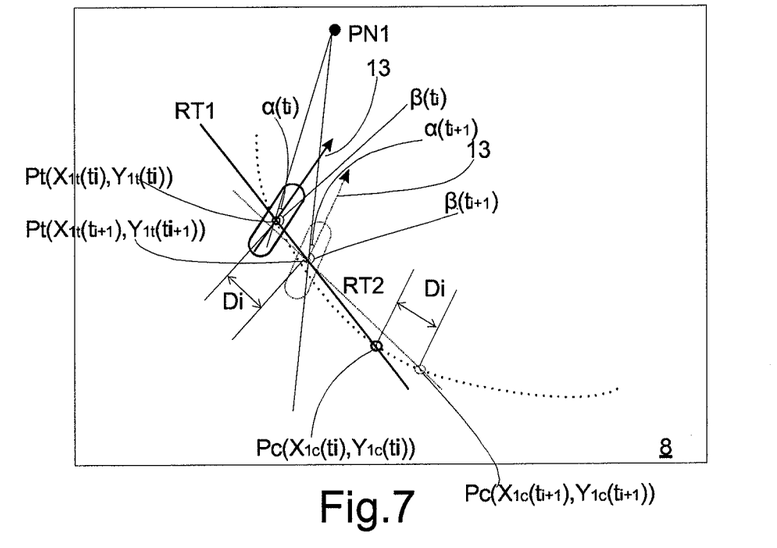
FIG. 7 is a schematic illustration of an example of the movement of roto-translation of the pointing axis of the virtual video camera in response to a translation of the pointer in the displacement plane.

Shown in FIG. 7 is a flowchart containing the operations of the roto-translation algorithm of the virtual video camera 7 implemented by the processing unit 5. The algorithm envisages determining the translation to be imparted on the axis of rotation 12 in the imaginary plane of displacement 8 and at the same time calculates the rotation to be imparted on the pointing axis 13 about the axis of rotation 12 in response to the translation of the pointer 9 in the imaginary plane of displacement 8.

Figure 8:
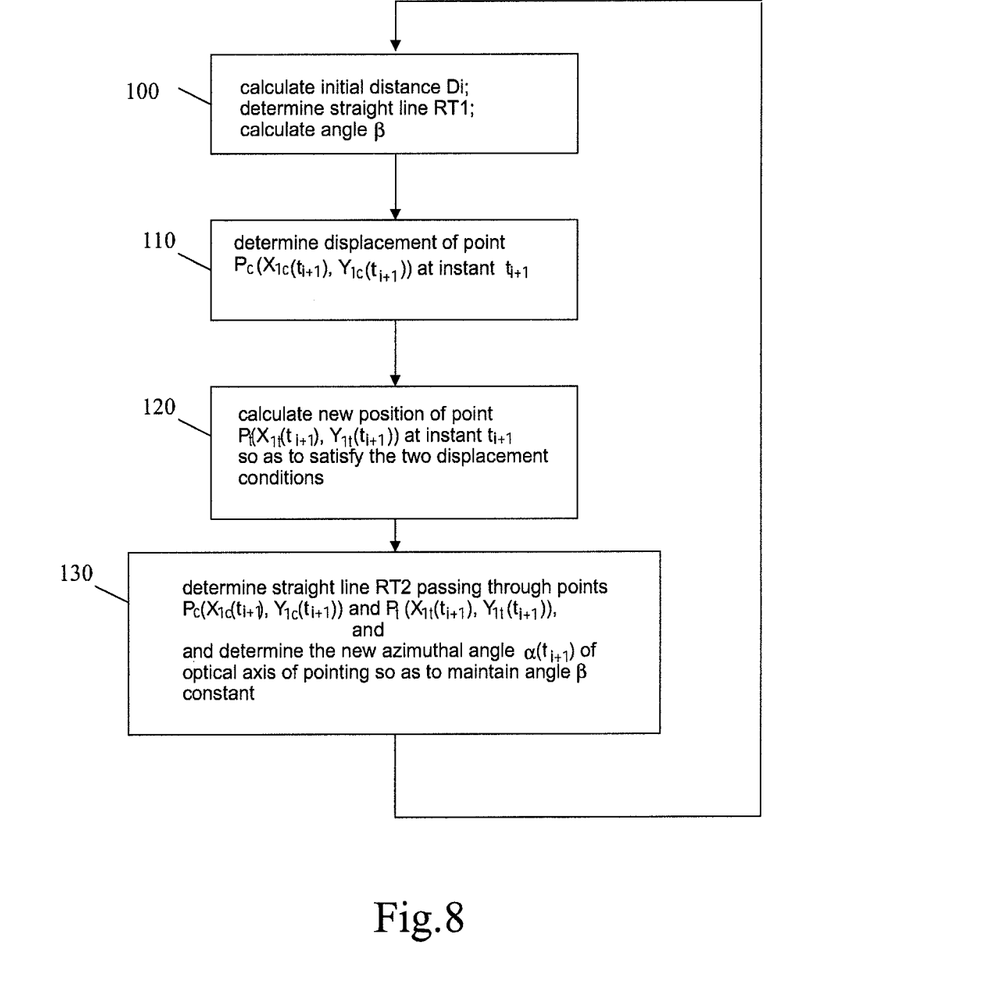
FIG. 8 is a flowchart of the operations executed by the method implemented by the system shown in FIG. 1.

In particular, with reference to FIGS. 7 and 8, the roto-translation algorithm envisages determination, at each manual translation of the pointer 9, of the displacement of the point $Pc(X_{1c}(t),Y_1(t))$ in the imaginary plane of displacement 8 in two successive instants $t_i$ and $t_{i+1}$ so as to determine the variation of the azimuthal angle α of the pointing axis 13 and the displacement of the point Pt.

In particular, at an initial instant $t_i=0$ the roto-translation algorithm calculates the initial distance Di between the point $Pc(X_{1c}(t_i),Y_{1c}(t_i))$ and the point $Pt(X_{1t}(t_i),Y_{1t}(t_i))$, determines the straight line $RT1(t_i)$ passing through the points $Pc(X_{1c}(t_i),Y_{1c}(t_i))$ and $Pt(X_{1t}(t_i),Y_{1t}(t_i))$, and calculates the angle β associated to the pointing axis 13 (block 100).

When between two successive instants $t_i$ and $t_{i+1}$ there occurs a displacement of the pointer 9 in the imaginary plane of displacement 8, the roto-translation algorithm determines a corresponding displacement of the point $Pc(X_{1c}(t_{i+1}),Y_{1c}(t_{i+1}))$ (block 110).

At this point, the roto-translation algorithm calculates the new position of the point $Pt(X_{1t}(t_{i+1}),Y_{1t}(t_{i+1}))$ i.e., the new position of the virtual video camera 8 and of its axis of rotation 12, in the three-dimensional simulation scenario 4.

Said calculation envisages identification in the imaginary plane of displacement 8, of the point $Pt(X_{1t}(t_{i+1}),Y_{1t}(t_{i+1}))$ that satisfies a first condition and a second condition, in which the first condition is satisfied when the point $Pt(X_{1t}(t_{i+1}),Y_{1t}(t_{i+1}))$ is at a distance from the point $Pc(X_{1c}(t_{i+1}),Y_{1c}(t_{i+1}))$ equal to the initial distance Di, whereas the second condition is satisfied when the point $Pt(X_{1t}(t_{i+1}),Y_{1t}(t_{i+1}))$ lies on the straight line $RT1(t_i)$ calculated at the preceding instant $t_i$ (block 120).

Once the position of the point $Pt(X_{1t}(t_{i+1}),Y_{1t}(t_{i+1}))$ has been determined, the roto-translation algorithm determines the straight line $RT2(t_{i+1})$ passing through the points $Pc(X_{1c}(t_{i+1}),Y_{1c}(t_{i+1}))$, and $Pt(X_{1t}(t_{i+1}),Y_{1t}(t_{i+1}))$, and determines the new azimuthal angle $\alpha(t_{i+1})$ of the pointing axis in such a way that the angle $\beta(t_{i+1})$ of the pointing axis 13 will remain constant, i.e., equal to the angle $\beta(t_i)$ calculated at the preceding instant $t_i$ (block 130).

At this point, the roto-translation algorithm issues a command for roto-translation of the pointing axis 13 as a function of the point $Pt(X_{1t}(t_{i+1}),Y_{1t}(t_{i+1}))$ and of the azimuthal angle $\alpha(t_{i+1})$. In the course of rotation of the pointing axis 13, the video camera 7 acquires the images in the simulation scenario 3, which are displayed by the system 1 through the screen 19. If at this point the displacement of the pointer 9 is repeated, the operations of the blocks 110-130 described above are implemented again.

The control of the roto-translation of the pointing axis 13 determines a consequent roto-translation of the virtual observation window 14 of the virtual video camera 7 within the virtual three-dimensional scenario 3, which conveniently enables an operator to track the displacement of an aircraft 5 and to keep observation on a pre-set portion of the aircraft 5 itself through a simple translation of the pointer 9 in the imaginary plane of displacement 8 displayed by the display 6.

Figure 9:
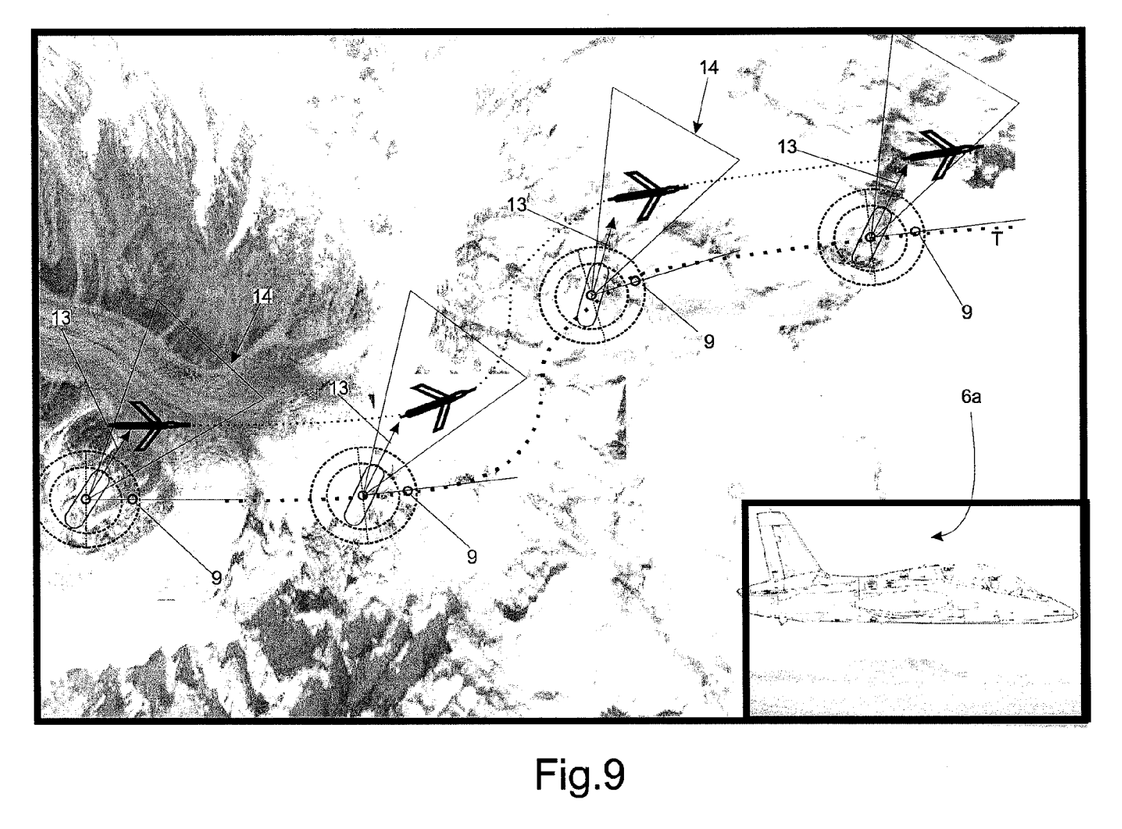
FIGS. 9 and 10 show as many examples of the movement of roto-translation of the pointing axis of the virtual video camera in the displacement plane in response to a translation of the pointer in the displacement plane itself.
Figure 10:
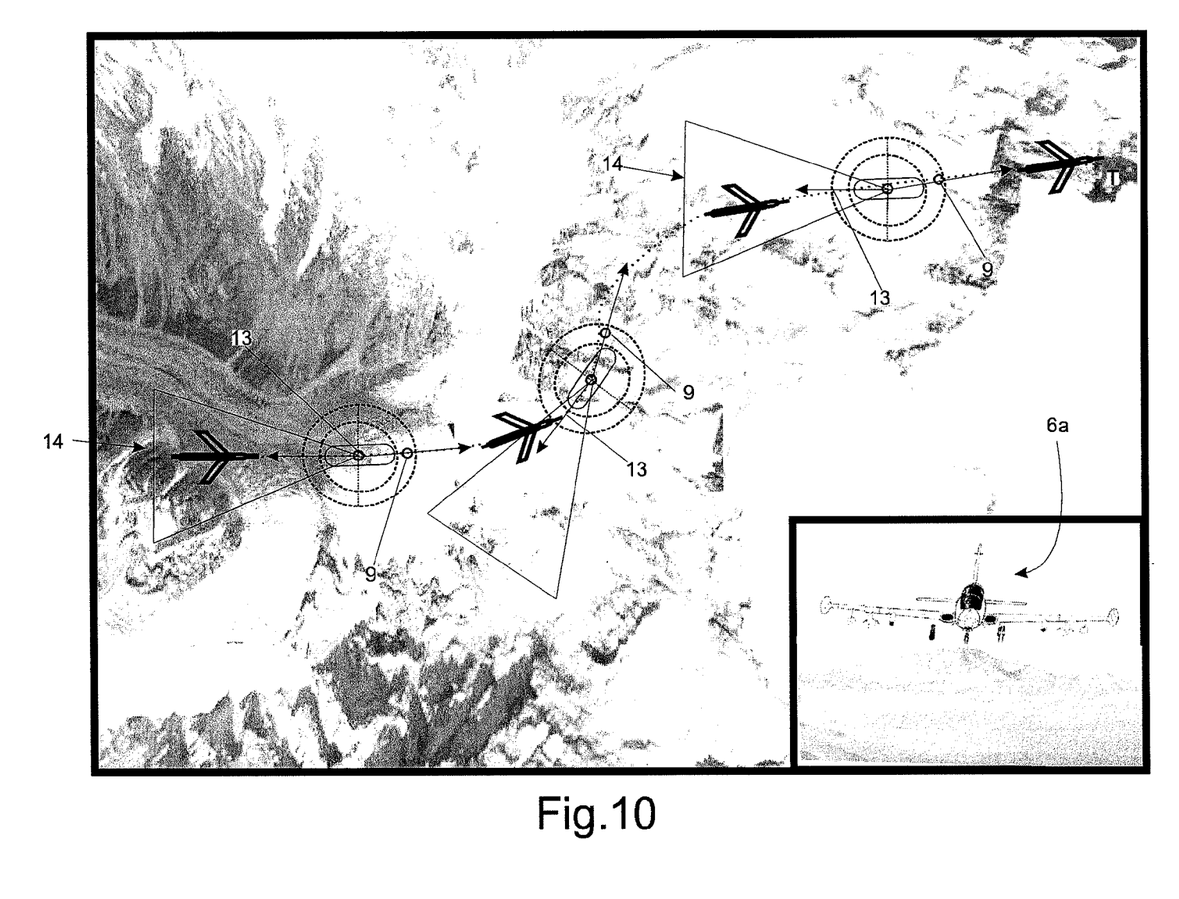

Shown in FIGS. 9 and 10 are two examples of roto-translation of the pointing axis 13 of the virtual video camera 7 in the imaginary plane of displacement 8 during the displacement of the pointer 9 along a path T.

In the case in point, in the example shown in FIG. 9, as the pointer 9 is dragged in the imaginary plane of displacement 8, the virtual observation window 14 remains constantly pointed on a side portion of the aircraft 5, whereas in FIG. 10, when the pointer 9 is dragged, i.e., displaced in the imaginary plane of observation 8, the virtual observation window 14 remains constantly pointed on the front portion of the aircraft 5.

Figure 11:
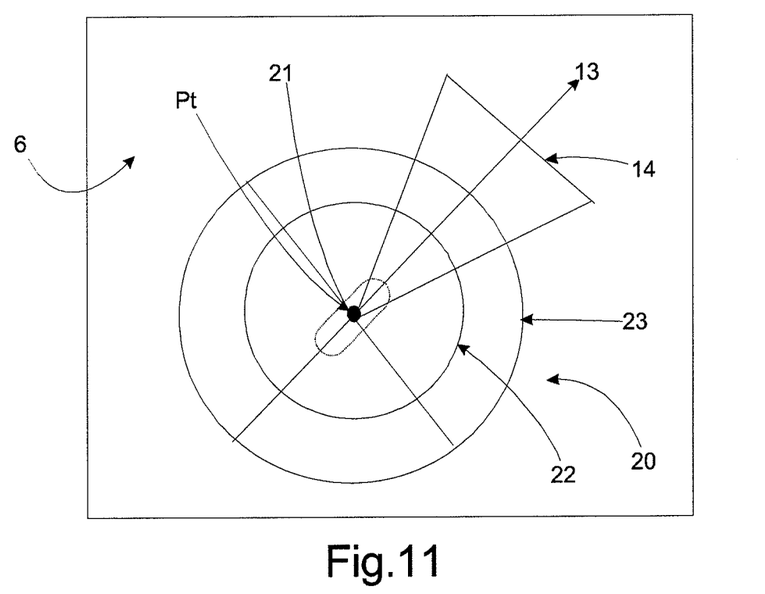
FIG. 11 shows a control area that can be displayed by the system shown in FIG. 1.

With reference to FIG. 11, the processing unit 11 can be configured for displaying on the display 6 a control area 20, which is divided into three control portions 21, 22 and 23, in which each control portion 21, 22 and 23 is associated to a corresponding function for controlling the movement of the pointing axis 13 of the virtual video camera 7.

In particular, the processing unit 11 is configured in such a way as to activate a function for controlling the movement of the pointing axis 13 of the virtual video camera 7 on the basis of the position of the pointer 9 within the control portion 21, 22 and 23.

In the example shown in FIG. 11, the control area 20 is divided into: a control portion 21, defined by the point Pt; a control portion 22, which comprises an annulus centred in the point Pt; and a control portion 23, which comprises an annulus positioned on the outside of the control portion 22 and is centred in the point Pt.

Figure 12:
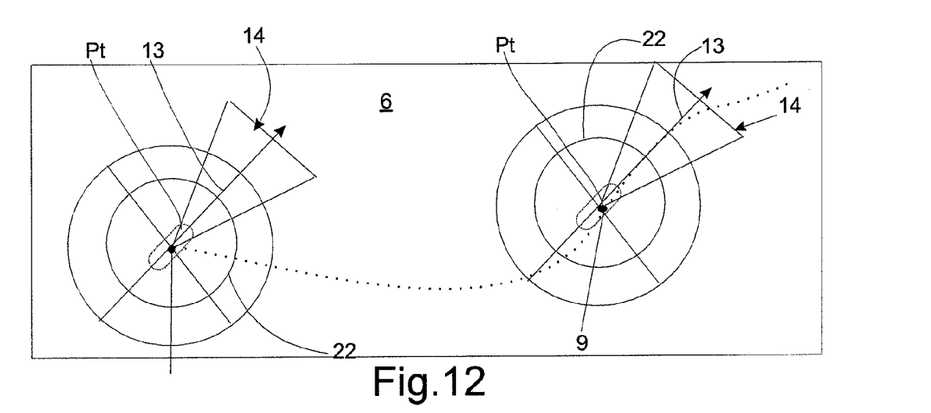
FIGS. 12, 13, and 14 show as many examples of the movement of the video camera as a function of the positioning of the pointer in the control area shown in FIG. 11.

In detail, the positioning of the pointer 9 on the point Pt and the activation of a command for selection of the control portion 21 determines the selection of a function of translation of the pointing axis 12 in the displacement plane 8 by the processing device 11. In particular, as shown in FIG. 12, following upon selection of the function of translation and during displacement of the pointer 9, the processing unit 11 translates the pointing axis 13 in the displacement plane 8 in such a way as to keep the azimuthal angle α and the initial distance Di between the point Pc and the point Pt constant.

If, instead, there occurs positioning of the pointer outside the point Pt but within the control portion 22, the processing device 11 detects the command for selection of a function of rotation of the pointing axis 13 in the displacement plane 8.

Figure 13:
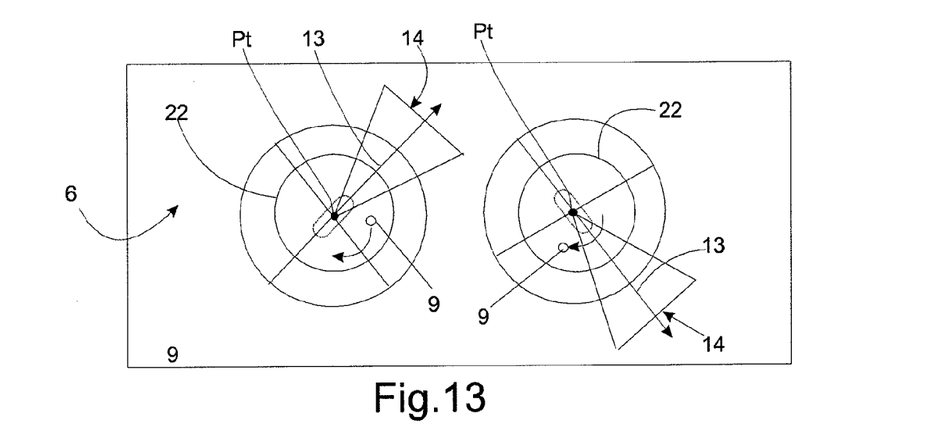

In particular, as shown in FIG. 13, following upon selection of the function of rotation and during displacement of the control pointer 9, the processing unit 5 rotates the pointing axis 13 in the displacement plane 8 in such a way as to vary the azimuthal angle α, at the same time keeping the point Pt fixed.

Figure 14:
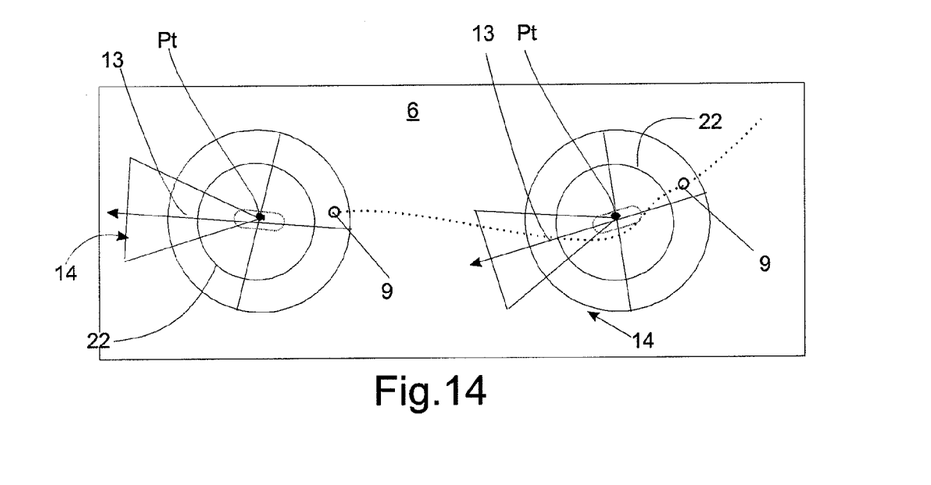

Finally, if there occurs positioning of the pointer within the control sector 23, the processing unit 11 detects selection of the function of roto-translation of the pointing axis 13 in the displacement plane 8 about the axis of rotation 12. In particular, as shown in FIG. 14, following upon a command for confirmation of the selection of the roto-translation function, the processing unit 11 rotates the pointing axis 13 and at the same time translates the pointing axis 13 itself in the displacement plane 8 on the basis of the translation of the pointer 9 described above.

From the foregoing description, it should be pointed out that the electronic display system described above can advantageously find application as stealth-view device or tactical-situation display, that can hence be used in an aircraft flight-simulation system used for training pilots.

The advantages of the electronic display system described herein are outlined in what follows. In the first place, the system enables an operator, such as for example a flight instructor, to impart on the virtual video camera 7 a roto-translation through a simple and single operation of translation of the pointer on the display. Said condition enables in fact the instructor to concern himself only with the displacement of the mouse or with the touch on the touch-sensitive surface in order to track the aircraft that is under observation, whereas the operation of displaying a portion of the aircraft itself is executed automatically by the system, without requiring the instructor to impart any manual command other than translation of the pointer.

As shown in FIG. 10, the instructor can advantageously maintain the view of the front portion of the aircraft along the path thereof simply by translating the pointer on the path itself.

In addition, the presence of the control area is extremely advantageous in so far as it enables the operator to select in a simple, fast, and intuitive way one of the three different functions of movement of the virtual video camera.

Finally, it is clear that modifications and variations may be made to the system described above, without thereby departing from the scope of the present invention, as defined by the annexed claims.

The invention claimed is:

1. An electronic system configured to display a three-dimensional simulation scenario; said electronic system comprising:
   electronic processing means configured to generate a three-dimensional simulation scenario that includes a moving vehicle represented in a three-dimensional graphic format and movable in a three-dimensional virtual graphic space of the three-dimensional simulation scenario on the basis of displacement commands input by a user or contained in a simulation program;
   display means configured to display said three-dimensional simulation scenario;
   a virtual video camera associated with a camera point of a displacement plane, which is located within said three-dimensional simulation scenario; said camera point indicating a position of the virtual video camera on the displacement plane; said virtual video camera having a pointing axis crossing said camera point, and being designed to rotate together with the pointing axis about a pre-set axis of rotation, which crosses said camera point and is located orthogonal to the displacement plane;
   a pointer associated with a dragging point indicating the position of the pointer on the displacement plane;
   control means configured to move said pointer on the displacement plane in response to a manual action of a user, the control means being configured to position and move said pointer independently of position and/or movement of the moving vehicle within the three-dimensional virtual graphic space;
   processing means configured to translate said axis of rotation, keeping it parallel to itself, in said displacement plane and, at the same time, rotate said pointing axis of said virtual video camera about said axis of rotation so as to obtain a roto-translation of said virtual video camera, in response to a translation of said pointer in said displacement plane;
   wherein:
   said control means are configured to enable a user to place the pointer on the displacement plane so that the dragging point is located at an initial distance from said camera point;
   said processing means are further configured to:
   determine a straight line lying in said displacement plane and crossing said camera point and said dragging point;
   determine an initial angle between the pointing axis of the virtual video camera and the straight line;
   and during a movement of the pointer in said displacement plane, translate the axis of rotation keeping the axis of rotation parallel to itself in said displacement plane and, at the same time, rotate said pointing axis of the virtual video camera about said axis of rotation so that:
   the distance between said camera point and said dragging point is maintained constant at a constant value which is equal to the initial distance; and
   the angle between the pointing axis of the virtual video camera and a straight line is maintained at a constant value which is equal to the initial angle.

2. The electronic system according to claim 1, wherein said virtual video camera is designed to acquire images through a virtual observation window set orthogonal to said pointing axis; said virtual observation window being stably constrained to said pointing axis to rotate about said axis of rotation together with the pointing axis itself as a function of the translation of said pointer in said displacement plane.

3. The electronic system according to claim 1, wherein said processing means are configured to:
   determine, in a first calculation instant ($t_i$), said first straight line that lies in said displacement plane and passes through a first camera point position at instant ($t_i$) and a first dragging point position at instant ($t_i$); and
   determine, during translation of said pointer between the first dragging point position assumed in said first instant ($t_i$) and a second dragging point position assumed in a second instant ($t_{i+1}$), a second straight line, which lies in said displacement plane, crosses through said second dragging point position and intersects said first straight line in a point of intersection having said initial distance from said first camera point position;
   assign the position of said point of intersection to said second camera point position in said second instant ($t_{i+1}$); and
   displace said virtual video camera into said point of intersection.

4. The electronic system according to claim 1, wherein said display means are designed to display a control area, which is divided into three distinct control portions, wherein each control portion is associated with a respective function for controlling translation and/or rotation of said virtual video camera.

5. The electronic system according to claim 4, wherein said processing means are configured to activate a function for controlling the movement of the pointing axis of said virtual video camera on the basis of the position of the pointer within said control portions.

6. The system according to claim 5, wherein said control area is divided into: a first control portion corresponding to said camera point; a second control portion comprising an annulus centred in said camera point; and a third control portion comprising an annulus external to said second control portion and centred in said camera point.

7. The system according to claim 6, wherein said processing means are configured to select a function of translation of said pointing axis in the displacement plane in response to a positioning of said pointer in said first control portion.

8. The system according to claim 6, wherein said processing means are configured to select a function of rotation of said pointing axis in said displacement plane about said axis of rotation in response to a positioning, selection, and displacement of said pointer within said second control portion.

9. The system according to claim 6, wherein said processing means are configured to translate said pointing axis in said displacement plane and at the same time rotate said pointing axis about said axis of rotation in response to a positioning of said pointer within said third control portion.

10. The system according to claim 1, wherein said control means comprise a pointing device designed to generate a control signal in response to a manual displacement by the user; said processing means being configured for displacing said pointer in said displacement plane on the basis of said control signal.

11. The system according to claim 10, wherein said pointing device comprises a mouse, and/or a joystick, and/or trackballs.

12. The system according to claim 10, wherein said pointing device comprises a screen provided with a touch-sensitive surface, and an electronic touch-detection module, capable of generating said control signal as a function of the position of touch by a user on said touch-sensitive surface.

13. The system according to claim 12, wherein said display means comprise said touch-sensitive surface.

14. The system according to claim 2, wherein said processing means are configured for displaying, instant by instant, through said display means the images acquired through said virtual observation window by said virtual video camera.

15. A computer implemented method for displaying a three-dimensional simulation scenario comprising the steps of:
(a) generating a three-dimensional simulation scenario that includes a moving vehicle represented in a three-dimensional graphic format and movable in a three-dimensional virtual graphic space of the three-dimensional simulation scenario on the basis of displacement commands input by a user or contained in a simulation program;
(b) displaying said three-dimensional simulation scenario to a user, through display means;
(c) arranging a virtual video camera on a camera point of a displacement plane which is located within said three-dimensional simulation scenario; said camera point indicating a position of the virtual video camera on the displacement plane; said virtual video camera having a pointing axis crossing the camera point; said virtual video camera being further configured to rotate together with the pointing axis about a pre-set axis of rotation, which crosses said camera point and is located orthogonal to the displacement plane;
(d) arranging a pointer in said displacement plane, said pointer being associated with a dragging point indicating the position of the pointer on the displacement plane;
(e) moving said pointer in said displacement plane in response to a manual action of said user;
(f) translating said axis of rotation, keeping it parallel to itself, in said displacement plane and, at the same time, rotating said pointing axis of said virtual video camera about said axis of rotation so as to obtain a roto-translation of said virtual video camera, in response to a translation of said pointer in said displacement plane;
(g) positioning said pointer on said displacement plane so that the dragging point is located at an initial distance from said camera point;
(h) determining a straight line lying in said displacement plane and crossing said camera point and said dragging point;
(i) determining an initial angle between the pointing axis of the virtual video camera and the straight line;
and, (j) during a movement of the pointer in said displacement plane, translating said axis of rotation and, at the same time, rotating said pointing axis of the virtual video camera about said axis of rotation so that:
the distance between said camera point and said dragging point is maintained at a constant value which is equal to the initial distance; and
the angle between the pointing axis of the virtual video camera and the straight line is maintained at a constant value which is equal to the initial angle;
wherein steps (d) and (e) cause said pointer to be positioned and moved independently of position and/or movement of the moving vehicle within the three-dimensional virtual graphic space.

16. The method according to claim 15, comprising the step of acquiring by said virtual video camera images through a virtual observation window set orthogonal to said pointing axis; said virtual observation window being stably constrained to said pointing axis to rotate about said axis of rotation together with the pointing axis itself as a function of the translation of said pointer in said displacement plane.

17. The method according to claim 15, comprising the steps of:
determining, in a first calculation instant ($t_i$) said first straight line lying in said displacement plane and passing through a first camera point position and said a first dragging point position; and
determining, during translation of said pointer between the first camera point position assumed in said first instant ($t_i$) and a second camera point position assumed in a second instant ($t_{i+1}$), a second straight line that lies in said displacement plane, passes through said second dragging point position and intersects said first straight line in a point of intersection having said initial distance from said first camera point position;
assigning the position of said point of intersection to said second camera point position in said second instant ($t_{i+1}$); and
moving said virtual video camera into said point of intersection.

18. The method according to claim 15, comprising the step of displaying, through said display means, a control area, which is divided into three control portions, wherein each control portion is associated to a respective function for controlling translation and/or rotation of said virtual video camera.

19. The method according to claim 18, comprising the step of activating a function for controlling the movement of the pointing axis of said virtual video camera on the basis of the position of said pointer within said control portions.

20. The method according to claim 19, wherein said control area is divided into: a first control portion corresponding to said camera point; a second control portion comprising an annulus centred in said camera point; and a third control portion comprising an annulus external to said second control portion and centred in said camera point.

21. The method according to claim 20, comprising the step of selecting a function of translation of said pointing axis in the displacement plane in response to a positioning of said pointer in said first control portion.

22. The method according to claim 20, comprising the step of selecting a function of rotation of said pointing axis in said displacement plane about said axis of rotation in response to a positioning, selection, and displacement of said pointer within said second control portion.

23. The method according to claim 20, comprising the step of translating said pointing axis in said displacement plane and rotating at the same time said pointing axis about said axis of rotation, in response to a positioning of said pointer within said third control portion.

\* \* \* \* \*